(12) United States Patent
Jensen

(10) Patent No.: US 7,349,677 B2
(45) Date of Patent: Mar. 25, 2008

(54) HARDWARE EFFICIENT RF TRANSCEIVER I/Q IMBALANCE COMPENSATION BASED UPON TAYLOR APPROXIMATION

(75) Inventor: Henrik T. Jensen, Long Beach, CA (US)

(73) Assignee: Broadcom Corporation, Irvine, CA (US)

( * ) Notice: Subject to any disclaimer, the term of this patent is extended or adjusted under 35 U.S.C. 154(b) by 707 days.

(21) Appl. No.: 10/821,057

(22) Filed: Apr. 8, 2004

(65) Prior Publication Data

US 2005/0227642 A1    Oct. 13, 2005

(51) Int. Cl.
*H04B 1/12* (2006.01)

(52) U.S. Cl. .................. 455/126; 455/127.2; 375/296; 375/324

(58) Field of Classification Search ................ 455/214, 455/232.1, 296, 303–310, 127.2, 115.1, 114.2, 455/126; 375/296, 324, 346, 349
See application file for complete search history.

(56) References Cited

U.S. PATENT DOCUMENTS

| | | | | |
|---|---|---|---|---|
| 5,705,949 | A * | 1/1998 | Alelyunas et al. | 329/304 |
| 6,330,290 | B1 * | 12/2001 | Glas | 375/324 |
| 6,377,620 | B1 * | 4/2002 | Ozluturk et al. | 375/235 |
| 6,771,709 | B2 * | 8/2004 | Huang et al. | 375/296 |
| 6,892,060 | B2 * | 5/2005 | Zheng | 455/302 |
| 6,931,343 | B2 * | 8/2005 | Webster et al. | 702/107 |
| 7,130,357 | B2 * | 10/2006 | Moon et al. | 375/296 |
| 7,130,359 | B2 * | 10/2006 | Rahman | 375/316 |
| 7,139,536 | B2 * | 11/2006 | Chiu | 455/115.1 |
| 2002/0181611 | A1 * | 12/2002 | Kim | 375/296 |
| 2002/0191713 | A1 * | 12/2002 | McVey | 375/308 |
| 2003/0112898 | A1 * | 6/2003 | Song et al. | 375/324 |
| 2003/0174783 | A1 * | 9/2003 | Rahman et al. | 375/298 |
| 2004/0082305 | A1 * | 4/2004 | Kirschenmann et al. | 455/232.1 |
| 2004/0264598 | A1 * | 12/2004 | Demir et al. | 375/297 |
| 2005/0069050 | A1 * | 3/2005 | Ding et al. | 375/296 |

\* cited by examiner

*Primary Examiner*—Blane J. Jackson
(74) *Attorney, Agent, or Firm*—Garlick, Harrison & Markison; James A. Harrison

(57) ABSTRACT

Radio transceiver circuitry includes I/Q imbalance compensation logic within at least one of a digital modulator or a digital demodulator, depending upon whether the I/Q imbalance compensation block is compensating for I/Q imbalance in a transmit path or in a receive path. For a transmitter, a digital processor includes a baseband processor that produces transmit data (digital data) for transmission to a digital modulator that includes an I/Q imbalance compensation logic. The digital modulator, which may modulate in any known modulation scheme, produces in-phase and quadrature phase components that have been pre-compensated for I/Q imbalance that is introduced by downstream analog circuitry in the transmit path. In at least one embodiment of the invention, a "steepest descent" algorithm for finding optimal values of I/Q imbalance compensation parameters based upon a small number of image rejection measurements are used.

17 Claims, 13 Drawing Sheets digital modulator 160 of a radio transmitter with I/Q imbalance compensation

FIG. 3 radio transmitter 100

FIG. 4  digital modulator 160 of a radio transmitter with I/Q imbalance compensation Figure 6  Θ compensation logic for phase compensator

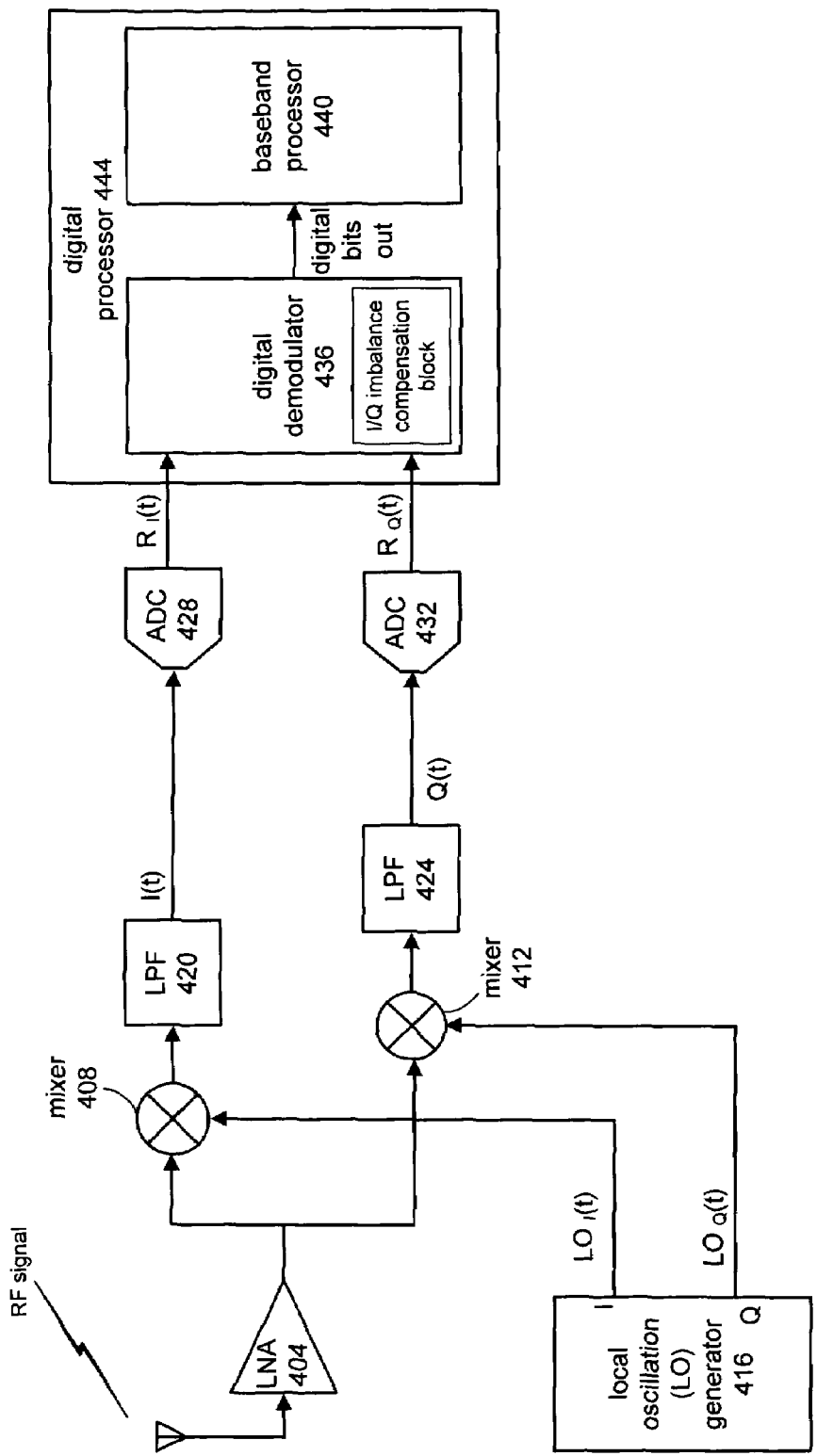
FIG. 10 radio receiver 400

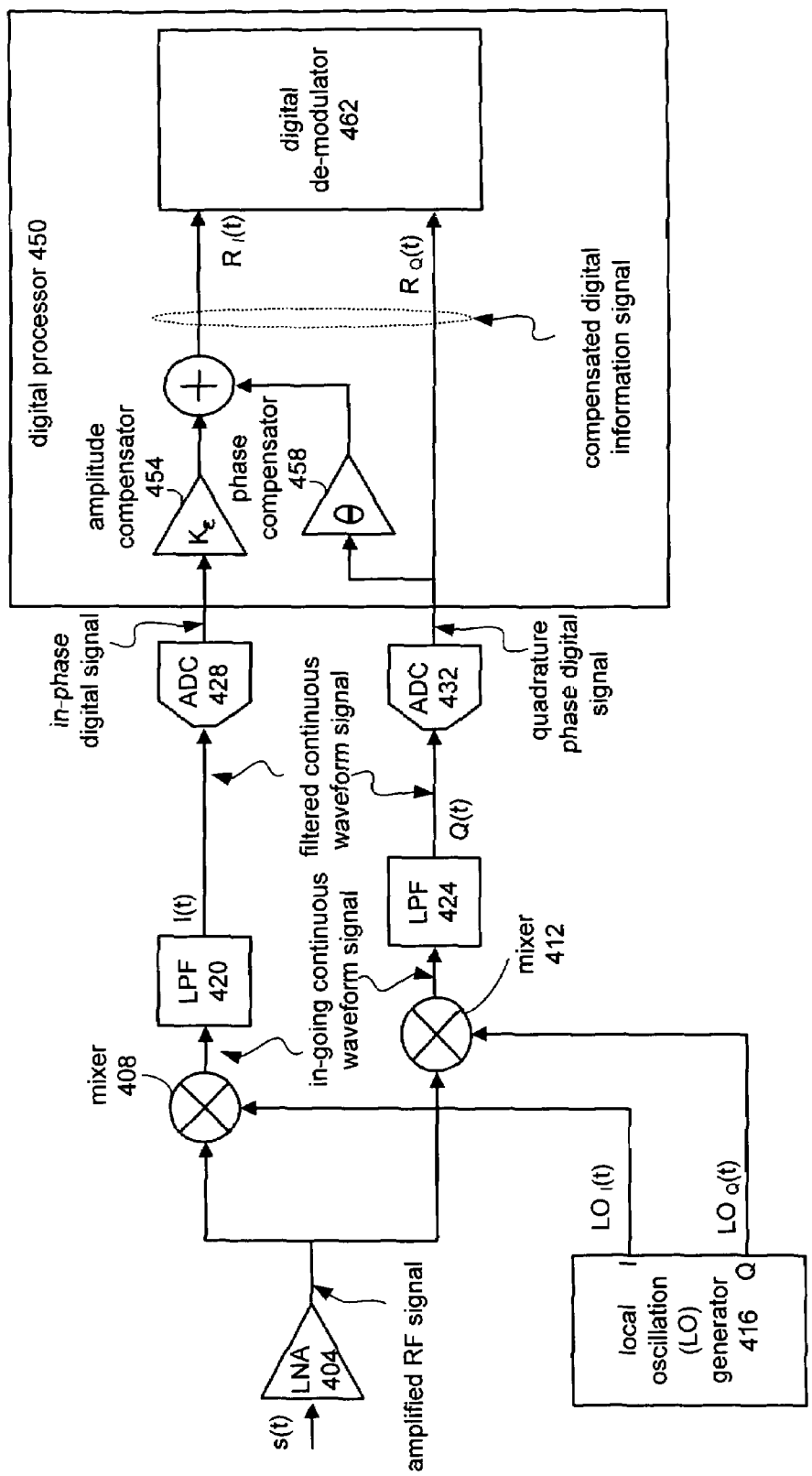
FIG. 11 radio receiver 400

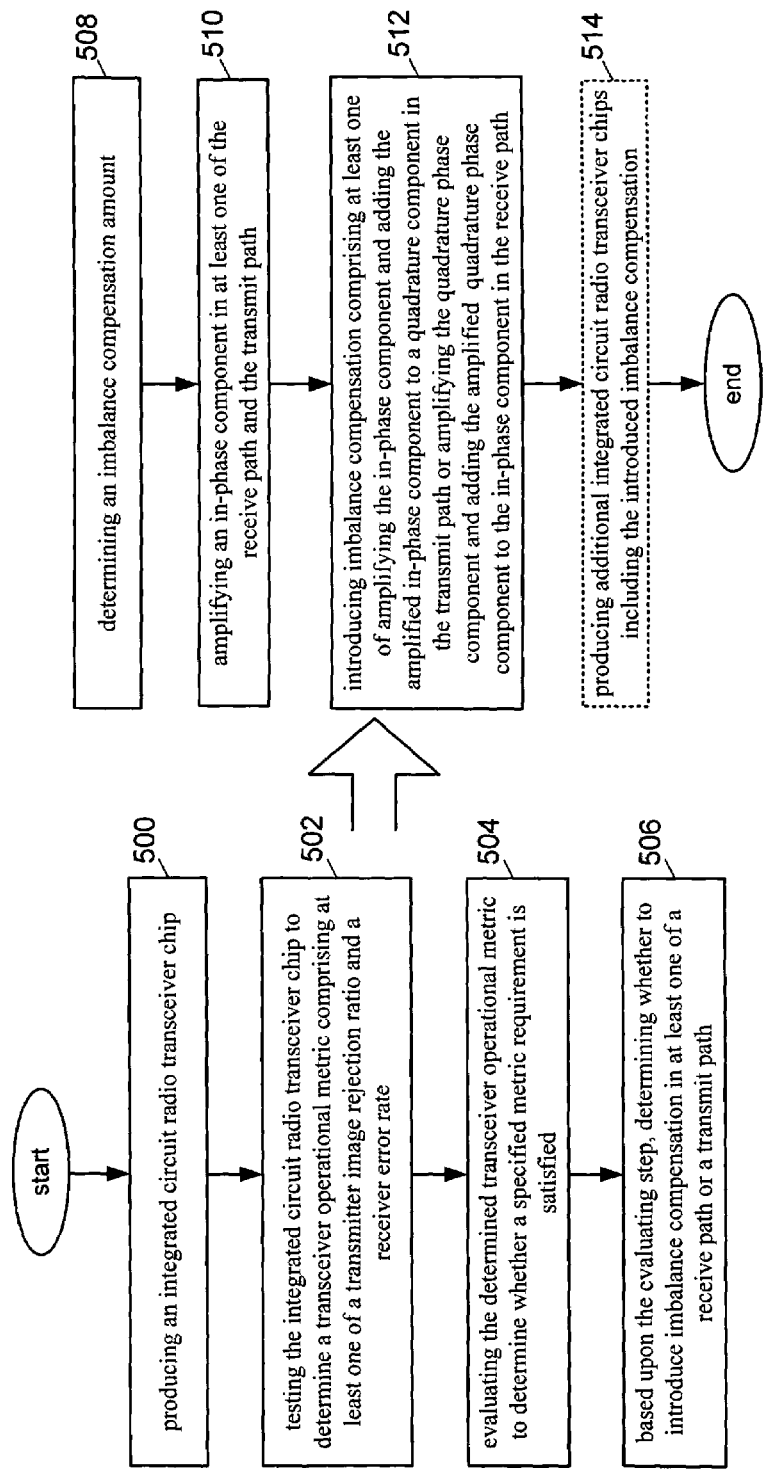
FIG 12  method for compensating for I/Q imbalance in production chips

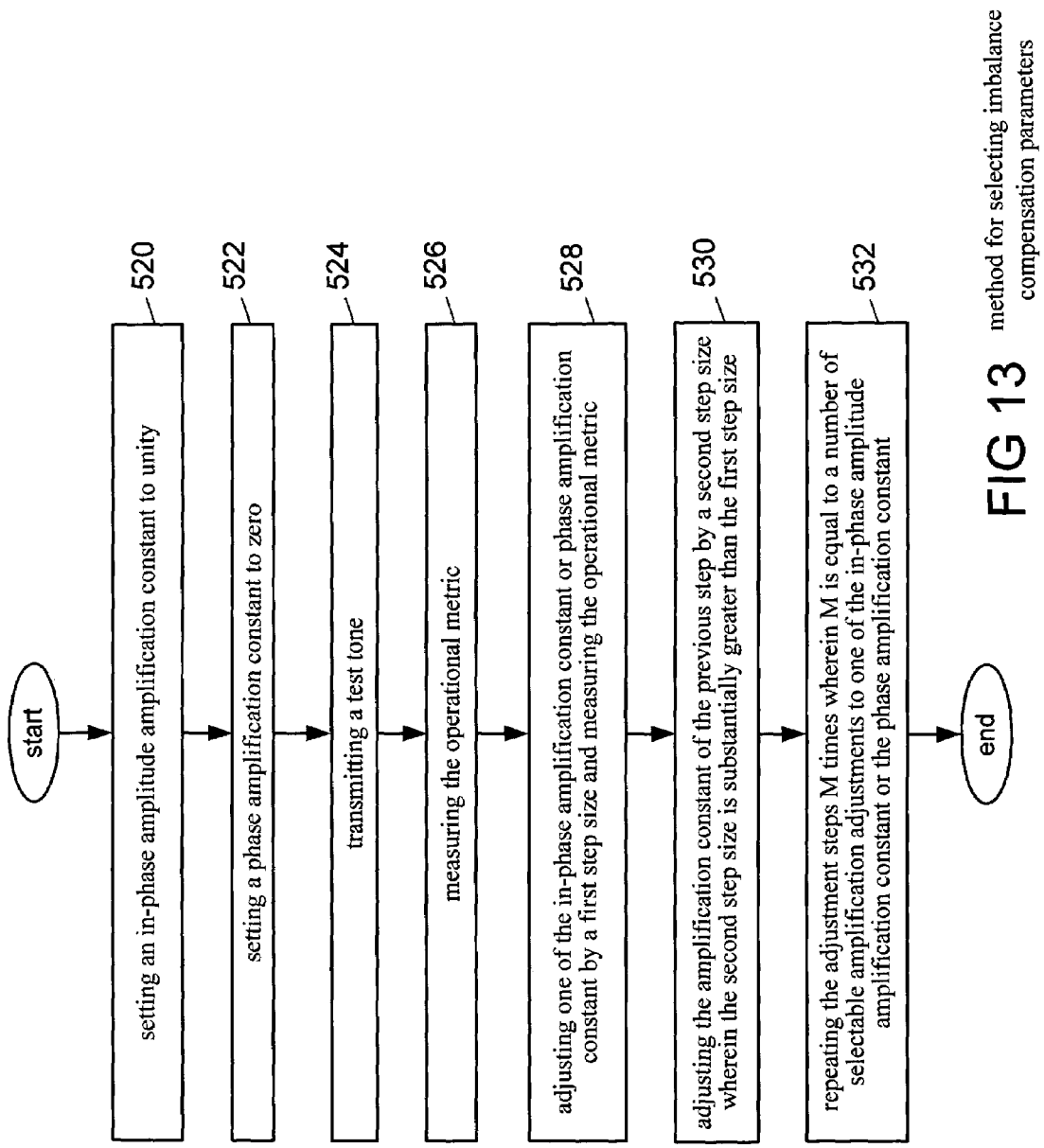

HARDWARE EFFICIENT RF TRANSCEIVER I/Q IMBALANCE COMPENSATION BASED UPON TAYLOR APPROXIMATION

BACKGROUND

1. Technical Field

The present invention relates to wireless communications and, more particularly, wideband wireless communication systems.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, etc., communicates directly or indirectly with other wireless communication devices. For direct communications (also known as point-to-point communications), the participating wireless communication devices tune their receivers and transmitters to the same channel or channels (e.g., one of a plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via a public switch telephone network (PSTN), via the Internet, and/or via some other wide area network.

Each wireless communication device includes a built-in radio transceiver (i.e., receiver and transmitter) or is coupled to an associated radio transceiver (e.g., a station for in-home and/or in-building wireless communication networks, RF modem, etc.). As is known, the transmitter includes a data modulation stage, one or more intermediate frequency stages, and a power amplifier. The data modulation stage converts raw data into baseband signals in accordance with the particular wireless communication standard. The one or more intermediate frequency stages mix the baseband signals with one or more local oscillations to produce RF signals. The power amplifier amplifies the RF signals prior to transmission via an antenna.

As is also known, the receiver is coupled to the antenna and includes a low noise amplifier, one or more intermediate frequency stages, a filtering stage, and a data recovery stage (de-modulator). The low noise amplifier receives an inbound RF signal via the antenna and amplifies it. The one or more intermediate frequency stages mix the amplified RF signal with one or more local oscillations to convert the amplified RF signal into a baseband signal or an intermediate frequency (IF) signal. As used herein, the term "low IF" refers to both baseband and intermediate frequency signals. A filtering stage filters the low IF signals to attenuate unwanted out of band signals to produce a filtered signal. The data recovery stage recovers raw data from the filtered signal in accordance with the particular wireless communication standard. Alternate designs being pursued at this time further include direct conversion radios that produce a direct frequency conversion often in a plurality of mixing steps or stages.

Phase locked loops (PLLs) are becoming increasingly popular in integrated wireless transceivers as components for frequency generation and modulation. PLLs are typically used for one of a variety of functions, including frequency translation to up-convert a baseband (BB) signal to an intermediate frequency (IF) or to up-convert a baseband or IF signal to RF prior to amplification by a power amplifier and transmission (propagation). PLLs allow for a high degree of integration and, when implemented with the appropriate amount of programmability, can form a main building block for modulators that operate over a wide range of frequencies. Typically, a baseband processor produces a baseband digital signal that is converted to a continuous waveform signal by a digital-to-analog converter (DAC). The continuous waveform signal constitutes the analog baseband signal that requires up-converting to IF and then RF.

One problem associated with PLLs is that of an imbalance between the in-phase component and the quadrature phase component of a signal either in a transmit path or in a receive path of a radio transceiver. Such I/Q imbalance results in several undesirable effects including poor transmitter image rejection ratios. Such I/Q imbalance typically is introduced within the PLLs, although they also may be introduced in any analog component within the transmit or receive path. What is needed, therefore, is a method and an apparatus that reduces the adverse affects of I/Q imbalance.

SUMMARY OF THE INVENTION

Radio transceiver circuitry includes I/Q imbalance compensation logic within at least one of a digital modulator or a digital demodulator, depending upon whether the I/Q imbalance compensation logic is compensating for I/Q imbalance in a transmit path or in a receive path. For a transmitter, a digital processor includes a baseband processor that produces transmit data (digital data) for transmission to a digital modulator that includes an I/Q imbalance compensation logic. The digital modulator, which may modulate in any known modulation scheme, produces in-phase and quadrature phase components that have been pre-compensated for I/Q imbalance that is introduced by downstream analog circuitry in the transmit path. For example, I/Q imbalance may result from amplitude or phase distortion introduced by any one of downstream digital-to-analog converters, low pass filters, mixers, or other circuitry.

More specifically, the digital modulation block of the transmitter produces in-phase components and quadrature phase components of a digital information signal that is pre-compensated by adding a gain component to the in-phase portion of the digital information signal and by adding an amplified in-phase component with the quadrature signal component of the digital information signal to produce a quadrature portion of the pre-compensated digital information signal that is phase and magnitude compensated. Stated more simply, an I component of the digital information signal is merely amplified with a constant gain level, while the Q component is summed with an amplified portion of the I component. The pre-compensated digital information signal is then converted from a digital signal to and analog signal to produce I and Q component continuous analog waveform signals. The I and Q continuous analog waveform component signals are then low pass filtered to produce filtered continuous analog waveform signals that are then mixed with a local oscillation in a mixer stage and are up-converted to RF. Up-converted I and Q components are then summed and amplified for transmission over the air. It is understood, of course, that references to the I component and the Q component refer to the in-phase component of the signal and to the quadrature phase component of the signal.

In the transmitter path, the invention includes determining a transmitter image rejection ratio and providing imbalance compensation to result in a transmitter image rejection ratio of a specified value (e.g., −45 dB). In a receiver path, operation is similar except that a quality metric such as bit or frame error rate is used to determine whether to improve I and Q channel imbalance. In the receiver path, however, a quadrature component is amplified and added to an in-phase component in addition to the in-phase component being amplified by a constant amount.

The invention includes a "steepest descent" algorithm for finding optimal values of I/Q imbalance compensation parameters based upon a small number of image rejection measurements.

BRIEF DESCRIPTION OF THE DRAWINGS

A better understanding of the present invention can be obtained when the following detailed description of the preferred embodiment is considered with the following drawings, in which:

FIG. 10 shows the typical top level block diagram of an RF receiver in accordance with modem design principles;

FIG. 11 is a functional block diagram of a radio receiver with I/Q imbalance compensation according to one embodiment of the present invention;

FIG. 12 is a flow chart illustrating a method for compensating for I/Q imbalance according to one embodiment of the present invention; and FIG. 13 is a flow chart illustrating a method for selecting imbalance compensation parameters according to one embodiment of the present invention.

DETAILED DESCRIPTION OF THE DRAWINGS

Figure 1:
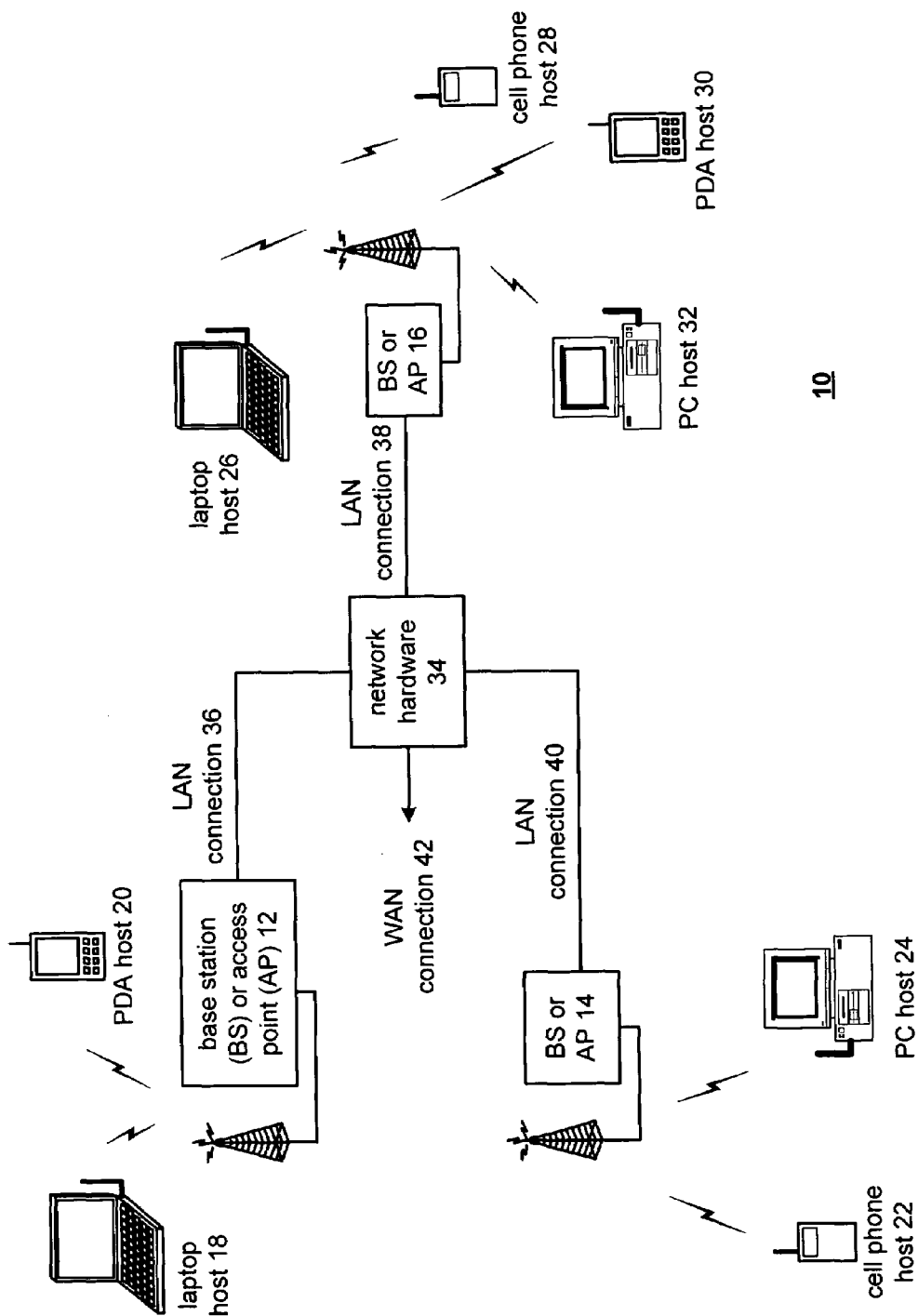
FIG. 1 is a functional block diagram illustrating a communication system that includes a plurality of base stations or access points (APs), a plurality of wireless communication and a network hardware component.

FIG. 1 is a functional block diagram illustrating a communication system 10 that includes a plurality of base stations or access points (APs) 12-16, a plurality of wireless communication devices 18-32 and a network hardware component 34. The wireless communication devices 18-32 may be laptop host computers 18 and 26, personal digital assistant hosts 20 and 30, personal computer hosts 24 and 32 and/or cellular telephone hosts 22 and 28. Any one of the wireless communication devices of FIG. 1 may readily suffer unacceptably low image rejection in a transmitter front end and/or bit error rates in a receiver front end due to in-phase (I) and quadrature (Q) imbalance. Accordingly, the teachings of the present invention to reduce I/Q imbalance effects are included therein in order to improve performance. The details of the wireless communication devices will be described in greater detail with reference to FIG. 2.

The base stations or APs 12-16 are operably coupled to the network hardware component 34 via local area network (LAN) connections 36, 38 and 40. The network hardware component 34, which may be a router, switch, bridge, modem, system controller, etc., provides a wide area network connection 42 for the communication system 10. Each of the base stations or access points 12-16 has an associated antenna or antenna array to communicate with the wireless communication devices in its area. Typically, the wireless communication devices 18-32 register with the particular base station or access points 12-16 to receive services from the communication system 10. For direct connections (i.e., point-to-point communications), wireless communication devices communicate directly via an allocated channel.

Typically, base stations are used for cellular telephone systems and like-type systems, while access points are used for in-home or in-building wireless networks. Regardless of the particular type of communication system, each wireless communication device includes a built-in radio and/or is coupled to a radio.

Figure 2:
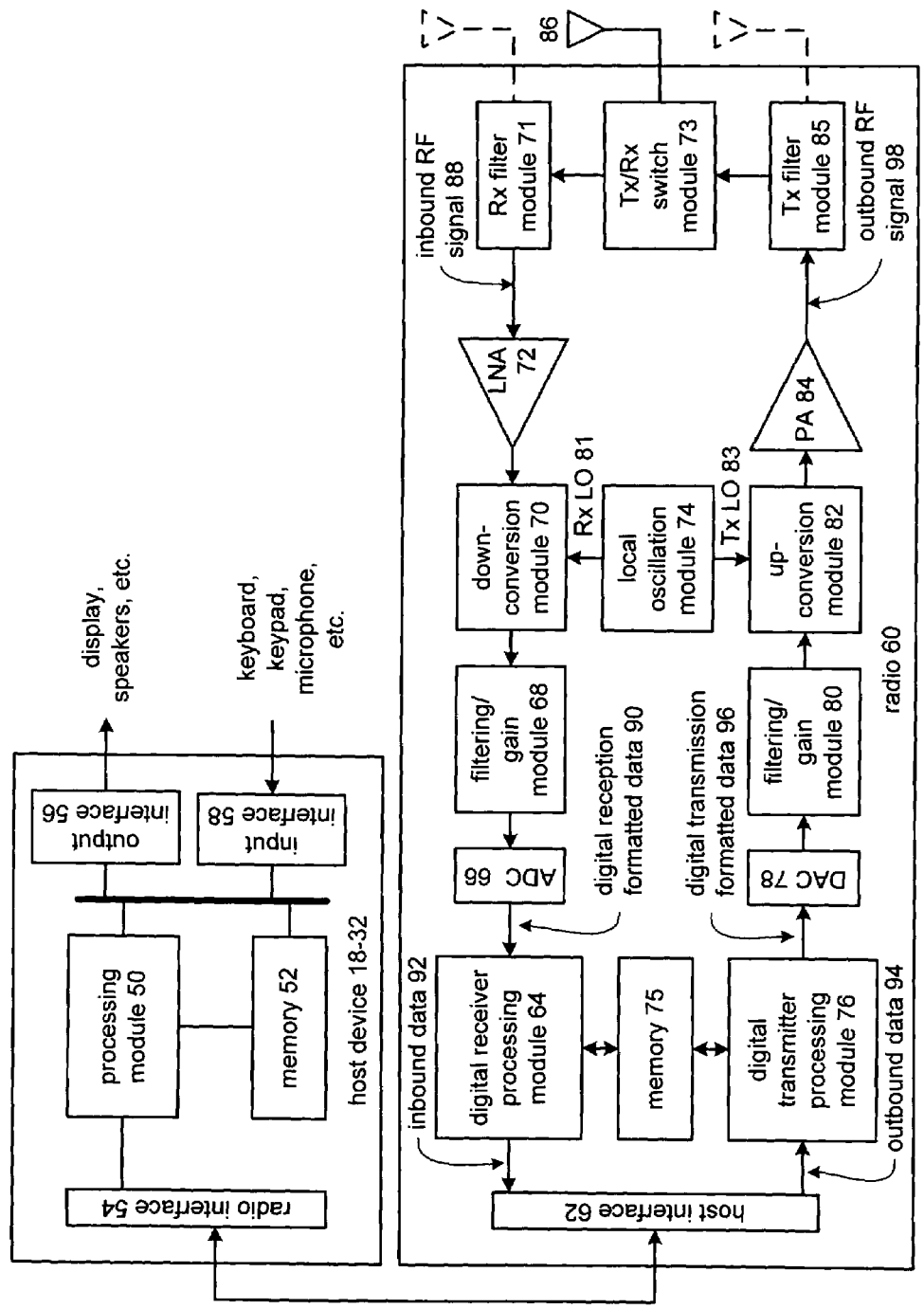
FIG. 2 is a schematic block diagram illustrating a wireless communication device as a host device and an associated radio.

FIG. 2 is a schematic block diagram illustrating a wireless communication device 18-32 as a host device and an associated radio 60. For cellular telephone hosts, the radio 60 is a built-in component. For personal digital assistants hosts, laptop hosts, and/or personal computer hosts, the radio 60 may be built-in or an externally coupled component.

As illustrated, the host wireless communication device 18-32 includes a processing module 50, a memory 52, a radio interface 54, an input interface 58 and an output interface 56. The processing module 50 and memory 52 execute the corresponding instructions that are typically done by the host device. For example, for a cellular telephone host device, the processing module 50 performs the corresponding communication functions in accordance with a particular cellular telephone standard.

The radio interface 54 allows data to be received from and sent to the radio 60. For data received from the radio 60 (e.g., inbound data), the radio interface 54 provides the data to the processing module 50 for further processing and/or routing to the output interface 56. The output interface 56 provides connectivity to an output device such as a display, monitor, speakers, etc., such that the received data may be displayed.

The radio interface 54 also provides data from the processing module 50 to the radio 60. The processing module 50 may receive the outbound data from an input device such as a keyboard, keypad, microphone, etc., via the input interface 58 or generate the data itself. For data received via the input interface 58, the processing module 50 may perform a corresponding host function on the data and/or route it to the radio 60 via the radio interface 54.

Radio 60 includes a host interface 62, a digital receiver processing module 64, an analog-to-digital converter 66, a filtering/gain module 68, a down-conversion module 70, a low noise amplifier 72, a receiver filter module 71, a transmitter/receiver (Tx/RX) switch module 73, a local oscillation module 74, a memory 75, a digital transmitter processing module 76, a digital-to-analog converter 78, a filtering/gain module 80, an IF mixing up-conversion module 82, a power amplifier 84, a transmitter filter module 85, and an antenna 86. The antenna 86 is shared by the transmit and receive paths as regulated by the Tx/Rx switch module 73. The antenna implementation will depend on the particular standard to which the wireless communication device is compliant.

The digital receiver processing module 64 and the digital transmitter processing module 76, in combination with operational instructions stored in memory 75, execute digital receiver functions and digital transmitter functions, respectively. The digital receiver functions include, but are not limited to, demodulation, constellation demapping, decoding, and/or descrambling. The digital transmitter functions include, but are not limited to, scrambling, encoding, constellation mapping, modulation. The digital receiver and transmitter processing modules 64 and 76, respectively, may be implemented using a shared processing device, individual processing devices, or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that when the digital receiver processing module 64 and/or the digital transmitter processing module 76 implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. The memory 75 stores, and the digital receiver processing module 64 and/or the digital transmitter processing module 76 executes, operational instructions corresponding to at least some of the functions illustrated herein. In one embodiment of the invention, I/Q imbalance compensation is performed in the digital processing modules. Here, in the radio of FIG. 2, the compensation is provided within digital receiver processing module 64 and within digital transmitter processing module 76.

In operation, the radio 60 receives outbound data 94 from the host wireless communication device 18-32 via the host interface 62. The host interface 62 routes the outbound data 94 to the digital transmitter processing module 76, which processes the outbound data 94 in accordance with a particular wireless communication standard (e.g., IEEE 802.11a, IEEE 802.11b, Bluetooth, etc.) to produce digital transmission formatted data 96. The digital transmission formatted data 96 will be a digital baseband signal or a digital low IF signal, where the low IF typically will be in the frequency range of 100 KHz to a few Mega-Hertz.

The digital-to-analog converter 78 converts the digital transmission formatted data 96 from the digital domain to the analog domain. The filtering/gain module 80 filters and/or adjusts the gain of the analog baseband signal prior to providing it to the up-conversion module 82. The up-conversion module 82 directly converts the analog baseband signal, or low IF signal, into an RF signal based on a transmitter local oscillation 83 provided by local oscillation module 74. Local oscillation module 74 is, in one embodiment of the invention, a multi-stage mixer as described herein. The power amplifier 84 amplifies the RF signal to produce an outbound RF signal 98, which is filtered by the transmitter filter module 85. The antenna 86 transmits the outbound RF signal 98 to a targeted device such as a base station, an access point and/or another wireless communication device.

The radio 60 also receives an inbound RF signal 88 via the antenna 86, which was transmitted by a base station, an access point, or another wireless communication device. The antenna 86 provides the inbound RF signal 88 to the receiver filter module 71 via the Tx/Rx switch module 73, where the Rx filter module 71 bandpass filters the inbound RF signal 88. The Rx filter module 71 provides the filtered RF signal to low noise amplifier 72, which amplifies the inbound RF signal 88 to produce an amplified inbound RF signal. The low noise amplifier 72 provides the amplified inbound RF signal to the down-conversion module 70, which directly converts the amplified inbound RF signal into an inbound low IF signal or baseband signal based on a receiver local oscillation signal 81 provided by local oscillation module 74. Local oscillation module 74 is, in one embodiment of the invention, a multi-stage mixer as described herein. The down-conversion module 70 provides the inbound low IF signal or baseband signal to the filtering/gain module 68. The filtering/gain module 68 may be implemented in accordance with the teachings of the present invention to filter and/or attenuate the inbound low IF signal or the inbound baseband signal to produce a filtered inbound signal.

The analog-to-digital converter 66 converts the filtered inbound signal from the analog domain to the digital domain to produce digital reception formatted data 90. The digital receiver processing module 64 decodes, descrambles, demaps, and/or demodulates the digital reception formatted data 90 to recapture inbound data 92 in accordance with the particular wireless communication standard being implemented by radio 60. The host interface 62 provides the recaptured inbound data 92 to the host wireless communication device 18-32 via the radio interface 54.

As one of average skill in the art will appreciate, the wireless communication device of FIG. 2 may be implemented using one or more integrated circuits. For example, the host device may be implemented on a first integrated circuit, while the digital receiver processing module 64, the digital transmitter processing module 76 and memory 75 are implemented on a second integrated circuit, and the remaining components of the radio 60, less the antenna 86, may be implemented on a third integrated circuit. As an alternate example, the radio 60 may be implemented on a single integrated circuit. As yet another example, the processing module 50 of host device 18-32 and the digital receiver processing module 64 and the digital transmitter processing module 76 of radio 60 may be a common processing device implemented on a single integrated circuit. Further, memory 52 and memory 75 may be implemented on a single integrated circuit and/or on the same integrated circuit as the common processing modules of processing module 50, the digital receiver processing module 64, and the digital transmitter processing module 76.

Figure 3:
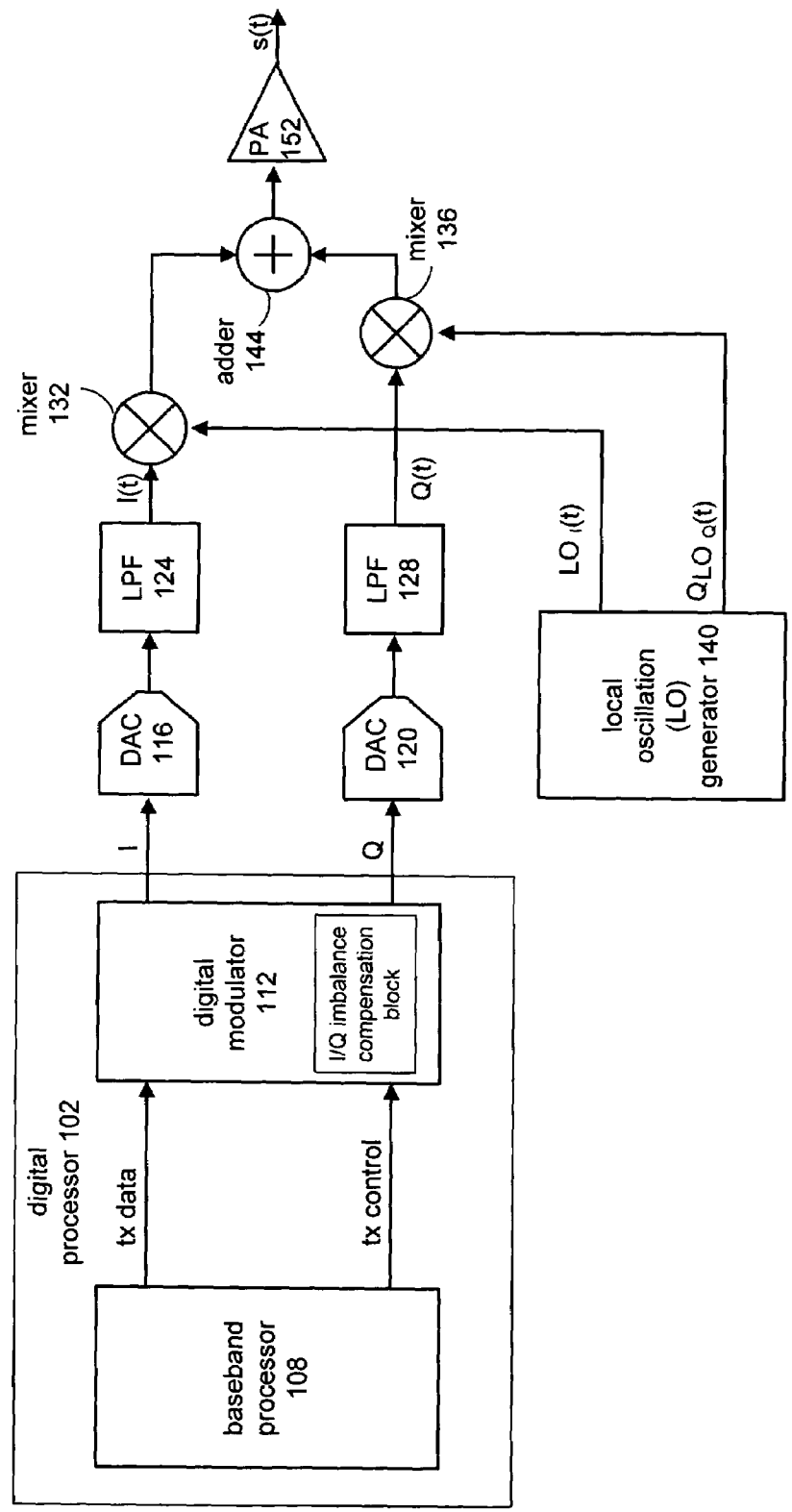
FIG. 3 shows an example top level diagram of an RF transmitter in accordance with one embodiment of the present invention including a base band processor and a digital modulator including an I/Q imbalance compensation block according to one embodiment of the invention.

FIG. 3 shows an example top level diagram of an RF transmitter in accordance with one embodiment of the present invention including a base band processor and a digital modulator including an I/Q imbalance compensation block according to one embodiment of the invention. It should be understood that the base band processor, the digital modulator including and the I/Q imbalance compensation block may be formed within one logic block. Here, the transmitter includes of a digital modulator followed by I/Q channel digital-to-analog converters (DACs), lowpass filters (LPFs), mixers, and a power amplifier (PA). The baseband processor provides TX data for transmission as well as basic TX transmission timing control. Also shown is a local oscillator (LO) generator block, which provides the quadrature-phase sinusoidal oscillation signals for translating the modulated signal to the desired RF frequency. Ideally, the LO signals behave as in equation (1) and appear as perfect cosine and sine waves for the in-phase and quadrature components.

$$LO_I(t) = \cos(\omega_c t)$$

and $$LO_Q(t) = \sin(\omega_c t) \quad (1)$$

where $$\omega_c = 2\pi f_c.$$

In practice, however, phase imbalance and gain mismatch result in LO components $$LO_I(t) = k(1+\epsilon)\cos(\omega_c t + \theta + \phi)$$

and $$LO_Q(t) = k \sin(\omega_c t + \phi),$$

where k, $\epsilon$, $\theta$, and $\phi$ are assumed to be time-invariant parameters. As it turns out, only differences in phase and amplitude of the LO signals are of negative consequence in transceivers. Thus, I/Q imbalance is fully defined by the I/Q imbalance parameters $\theta$ and $\epsilon$ and for the purposes of analyzing the effects of I/Q imbalance it suffices to assume $$LO_I(t) = (1+\epsilon)\cos(\omega_c t + \theta)$$

and $$LO_Q(t) = \sin(\omega_c t), \quad (2)$$

where $\theta$ typically is specified in degrees (°) and $\epsilon$ typically is specified in percent (%). In standard CMOS technology optimized for digital processing wherein, commonly $|\theta|<5°$ and $|\epsilon|<10\%$.

Letting I(t) and Q(t) denote the in-phase and quadrature components of the modulated baseband output, with ideal circuit behavior, the output signal s(t) is given by:

$$s(t) = I(t)\cos(\omega_c t) + Q(t)\sin(\omega_c t),$$

where any gain of the PA has been ignored.

However, with I/Q imbalance, as defined in (2), the transmitter output is $$s(t) = I(t)(1+\epsilon)\cos(\omega_c t + \theta) + Q(t)\sin(\omega_c t). \quad (3)$$

To arrive at a useful approximation of equation (3), a Taylor expansion is used according to the described embodiment of the invention. As is known, the general form of Taylor expansion of a function $f$ around a point a is $$f(a+x) = \sum_{n=0}^{N} \frac{x^n}{n!} f^{(n)}(a) + R_N,$$

where, for smooth continuous functions, $R_N$ is a remainder term that approaches zero as N approaches infinity. Thus, $N^{th}$ order Taylor approximation consists of the terms $$f(a+x) \approx \sum_{n=0}^{N} \frac{x^n}{n!} f^{(n)}(a).$$

Therefore, first order Taylor approximation of (3) yields $$\cos(\omega_c t + \theta) \approx \cos(\omega_c t) - \theta \sin(\omega_c t),$$

which, as will be demonstrated in a later section, is accurate for the values of $\theta$ considered here.

Hence, in the presence of I/Q imbalance, $$s(t) \approx I(t)(1+\epsilon)[\cos(\omega_c t) - \theta \sin(\omega_c t)] + Q(t)\sin(\omega_c t) = (1+\epsilon)I(t)\cos(\omega_c t) - (1+\epsilon)\theta I(t)\sin(\omega_c t) + Q(t)\sin(\omega_c t). \quad (4)$$

Thus, the "cross-talk" factor, as that term is known by one of average skill in the art, between the in-phase and quadrature phases of the transmitter is given by $$(1+\epsilon)\theta. \quad (5)$$

Defining $$K_\epsilon = \frac{1}{1+\epsilon}, \quad (6)$$

such cross-talk therefore exists for the radio transmitter of FIG. 3 without imbalance compensation by the I/Q imbalance compensation block of digital modulator 112 of FIG. 3. The imbalance compensation block of FIG. 3 may be formed according to logic illustrated more specifically in relation to FIG. 4.

Figure 4:
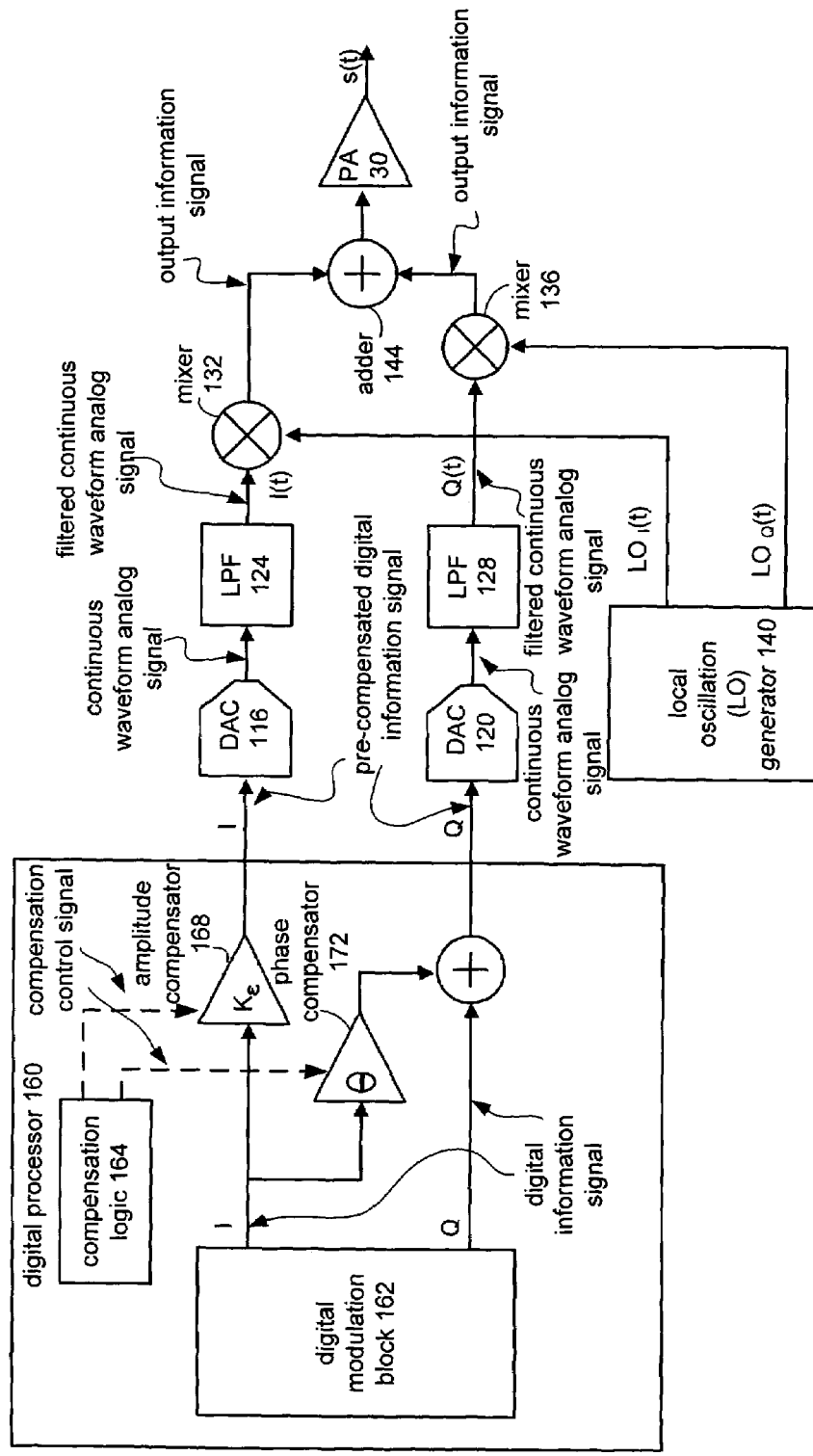
FIG. 4 is a functional block diagram of a radio transmitter with I/Q imbalance compensation according to one embodiment of the present invention.

FIG. 4 is a functional block diagram of a radio transmitter with I/Q imbalance compensation according to one embodiment of the present invention. The result of equation (4) above may be implemented in a transmitter with a transmitter I/Q imbalance compensation scheme as shown in FIG. 4 wherein an in-phase component is produced to and amplified by a phase compensator and added with the quadrature component and wherein the in-phase component is further amplified a specified amount.

More specifically, a digital processor 160 includes a digital modulation block 162 that produces a digital information signal having I and Q components. Compensation logic 164 produces a compensation control signal to each of an amplitude compensator 168 and a phase compensator 172. The I component is produced to amplitude compensator 168 which merely amplifies (or attenuates) a magnitude of the I component of the digital information signal. The I component is further produced to phase compensator 172 which amplifies (or attenuates) a magnitude of the I component of the digital information signal and produces an amplitude compensated signal of the in-phase component for summing with the quadrature component of the digital information signal thereby compensating the quadrature phase component in both magnitude and phase.

Justification for the circuitry of FIG. 4 to compensate for I/Q imbalance is as follows. Using the previous derivations for a signal s(t) with cross-talk from I/Q imbalance, $$s(t)=I'(t)(1+\epsilon)\cos(\omega_c t+\theta)+Q'(t)\sin(\omega_c t)=K_\epsilon I(t)(1+\epsilon)\cos(\omega_c t+\theta)+(Q(t)+\theta I(t))\sin(\omega_c t)\approx I(t)[\cos(\omega_c t)-\theta \sin(\omega_c t)]+Q(t)\sin(\omega_c t)+\theta I(t)\sin(\omega_c t)=I(t)\cos(\omega_c t)+Q(t)\sin(\omega_c t),$$

It may be seen, therefore, that s(t) has the form as desired with ideal compensation. As will be explained in greater detail below, the digital modulator pre-compensates the I and Q components to result in an output s(t) that has significantly reduced crosstalk from I and Q imbalances but does not provide ideal compensation in favor of circuit simplicity.

Applying the first terms of the Taylor series, $$\frac{1}{1+\epsilon} = 1 + \sum_{j=1}^{\infty} \frac{(\pm 1)^j}{(j-1)!} \epsilon^j, \quad (7)$$

an approximate expression for $K_\epsilon$ is $$K_\epsilon \approx 1 - \epsilon + \epsilon^2 - \ldots$$

In practice, perfect I/Q imbalance compensation is not needed, which results in the fact that the compensation coefficients $K_\epsilon$ and $\theta$ in FIG. 4 can be implemented with very simple hardware. For example, as will be demonstrated shortly, for the case $$|\theta| \leq 5° \text{ and } |\epsilon| \leq 10\%$$

an efficient and sufficiently accurate digital implementation of $K_\epsilon$ is suggested by (7) and is given by $$K_\epsilon = 1 + s_\epsilon \sum_{i=0}^{4} a_i 2^{-(i+4)}, \quad (8)$$

where $$s_\epsilon \in \{-1,+1\} \text{ and } a_i \in \{0,1\},$$

and an efficient and sufficiently accurate implementation of the coefficient $\theta$ is given by $$\theta = s_\theta \sum_{i=0}^{4} b_i 2^{-(i+4)}, \quad (9)$$

where $$s_\theta \in \{-1,+1\} \text{ and } b_i \in \{0,1\}.$$

Thus, the compensation as shown within digital processor 160 of FIG. 4 may be used to compensate for I/Q imbalance in a practical sense.

Figure 5:
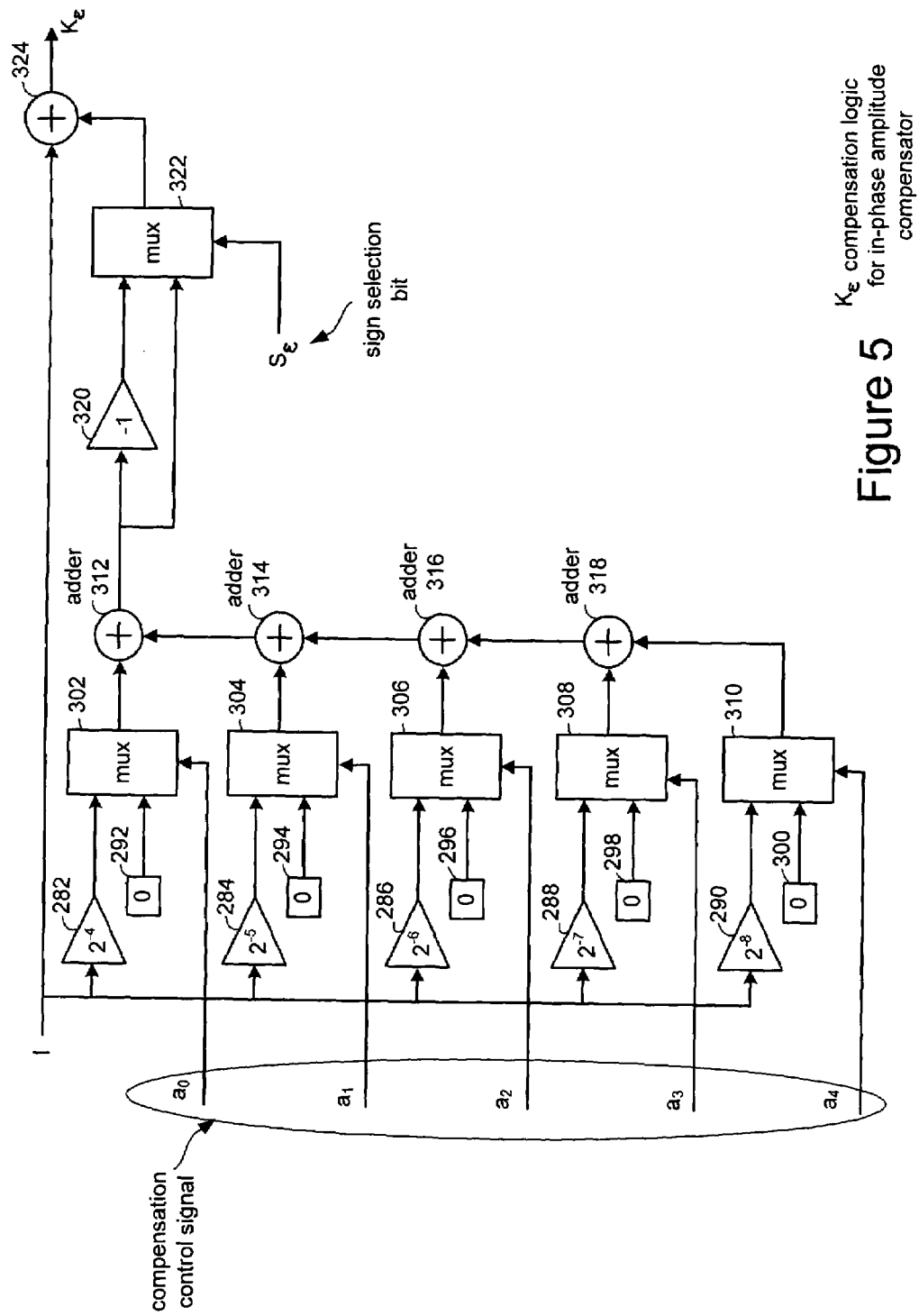
FIGS. 5 and 6 are functional schematic block diagrams of compensation logic for compensating for I and Q imbalance according to one embodiment of the invention.
Figure 6:
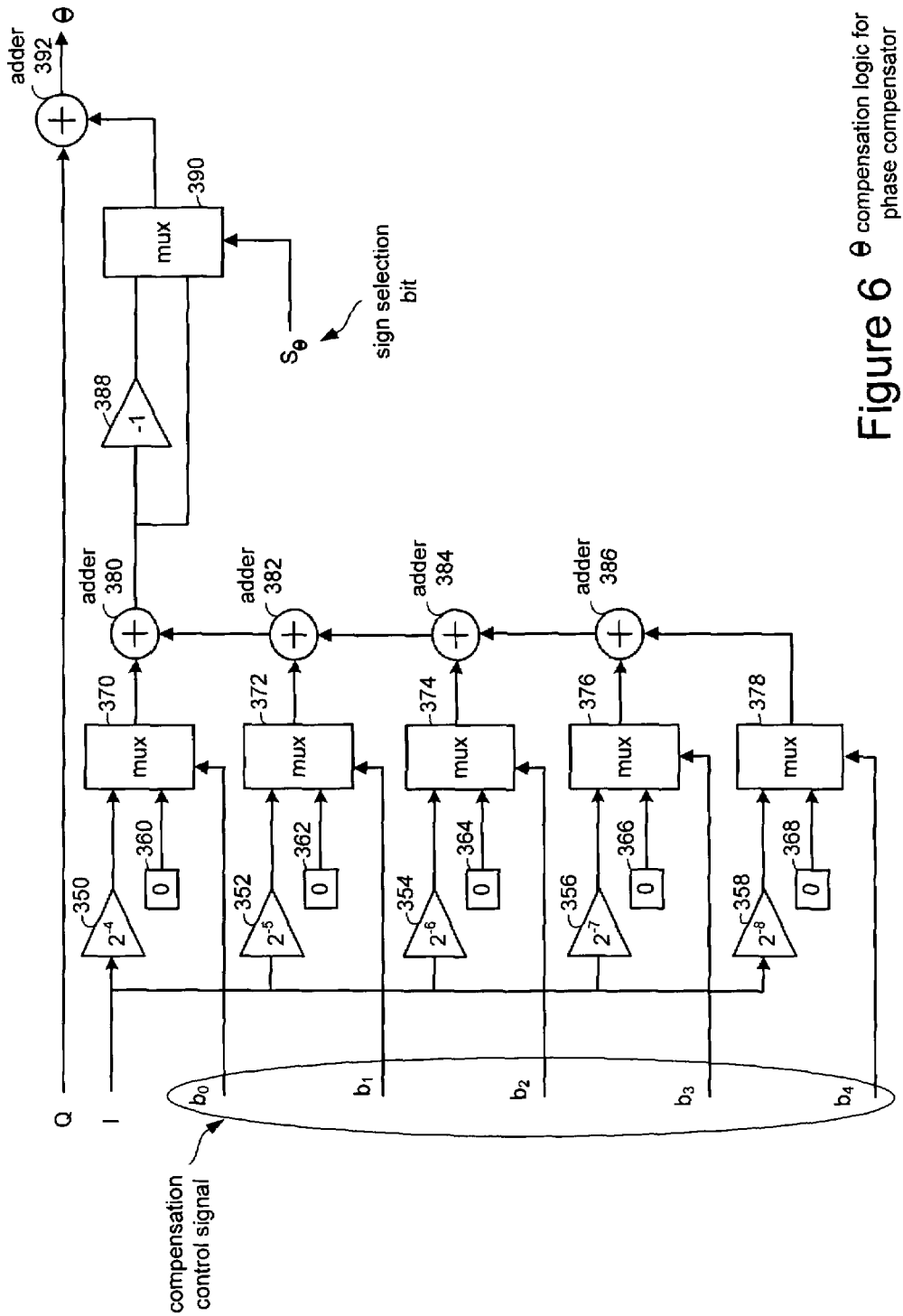

FIGS. 5 and 6 are functional schematic block diagrams of compensation logic for compensating for I and Q imbalance according to one embodiment of the invention. Since, in digital processing, multiplying a number n by a factor $2^{-k}$, for some integer k, merely involves shifting n by k bit places, it follows from equations (8) and (9) that compensation can be implemented with two 6-input adders where the inputs are appropriately shifted versions of the signals. Such implementations are shown functionally in FIG. 5 and FIG. 6, respectively.

In many practical situations, it is difficult or even impossible to directly determine the transmitter I/Q imbalance parameters $\theta$ and $\epsilon$ because they are complicated non-linear functions of circuit and transistor behavior. Instead, the I/Q imbalance can be measured indirectly either through a measurement of the modulation error (EVM) of the transmitter or by a tone-test, wherein the transmitter is configured to transmit a sinusoidal signal.

Thus, in such a sinusoidal tone-test configuration, $$I(t)=\cos(\omega_{IF} t) \text{ and } Q(t)=\sin(\omega_{IF} t).$$

With ideal circuit behavior, $$s(t)=\cos(\omega_{IF} t)\cos(\omega_c t)+\sin(\omega_{IF} t)\sin(\omega_c t)=\tfrac{1}{2}[\cos(\omega_c-\omega_{IF})t+\cos(\omega_c+\omega_{IF})t]+\tfrac{1}{2}[\cos(\omega_c-\omega_{IF})t-\cos(\omega_c+\omega_{IF})t]=\cos(\omega_c-\omega_{IF})t$$

Thus, signal energy is only emitted in the desired band at $f_c - f_{IF}$.

However, in the presence of I/Q imbalance, $$s(t)=\cos(\omega_{IF} t)(1+\epsilon)\cos(\omega_c t+\theta)+\sin(\omega_{IF} t)\sin(\omega_c t)\approx (1+\epsilon)[\cos(\omega_{IF} t)\cos(\omega_c t)-\theta\cos(\omega_{IF} t)\sin(\omega_c t)]+\sin(\omega_{IF} t)\sin(\omega_c t)=\tfrac{1}{2}(1+\epsilon)[\cos(\omega_c-\omega_{IF})t+\cos(\omega_c+\omega_{IF})t-\theta(\sin(\omega_c-\omega_{IF})t+\sin(\omega_c+\omega_{IF})t)]+\tfrac{1}{2}[\cos(\omega_c-\omega_{IF})t+\cos(\omega_c-\omega_{IF})t]=\tfrac{1}{2}[(2+\epsilon)\cos(\omega_c-\omega_{IF})t-(1+\epsilon)\theta\sin(\omega_c-\omega_{IF})t]+\tfrac{1}{2}[\epsilon\cos(\omega_c+\omega_{IF})t-(1+\epsilon)\sin(\omega_c+\omega_{IF})t]$$

Thus, signal energy is emitted in both the desired band at $f_c - f_{IF}$ and in the "image band" at $f_c + f_{IF}$. The signal in the image band is $$s_i(t)=\tfrac{1}{2}[\epsilon\cos(\omega_c+\omega_{IF})t-(1+\epsilon)\theta\sin(\omega_c+\omega_{IF})t]$$

and the power of this signal is $$P_i=k[\epsilon^2+(1+\epsilon)^2\theta^2]\approx k(\epsilon^2+\theta^2), \quad (10)$$

where k is a proportionality constant.

The signal in the desired band is $$s_d(t)=\tfrac{1}{2}[(2+\epsilon)\cos(\omega_c-\omega_{IF})t-(1+\epsilon)\theta\sin(\omega_c+\omega_{IF})t]$$

and the power of this signal is $$P_d=k[(2+\epsilon)^2+(1+\epsilon)^2\theta^2]\approx 4k(1+\epsilon), \quad (11)$$

where k is the same proportionality constant as in (10).

Hence, the ratio between the powers of the signals in the desired band and the image band of the un-compensated transmitter is the transmitter un-compensated image rejection ratio, TUIRR, $$TUIRR = 6 + 10 \times \log_{10}\left(\frac{1+\epsilon}{\epsilon^2+\theta^2}\right) \text{ dB}. \quad (12)$$

Figure 7:
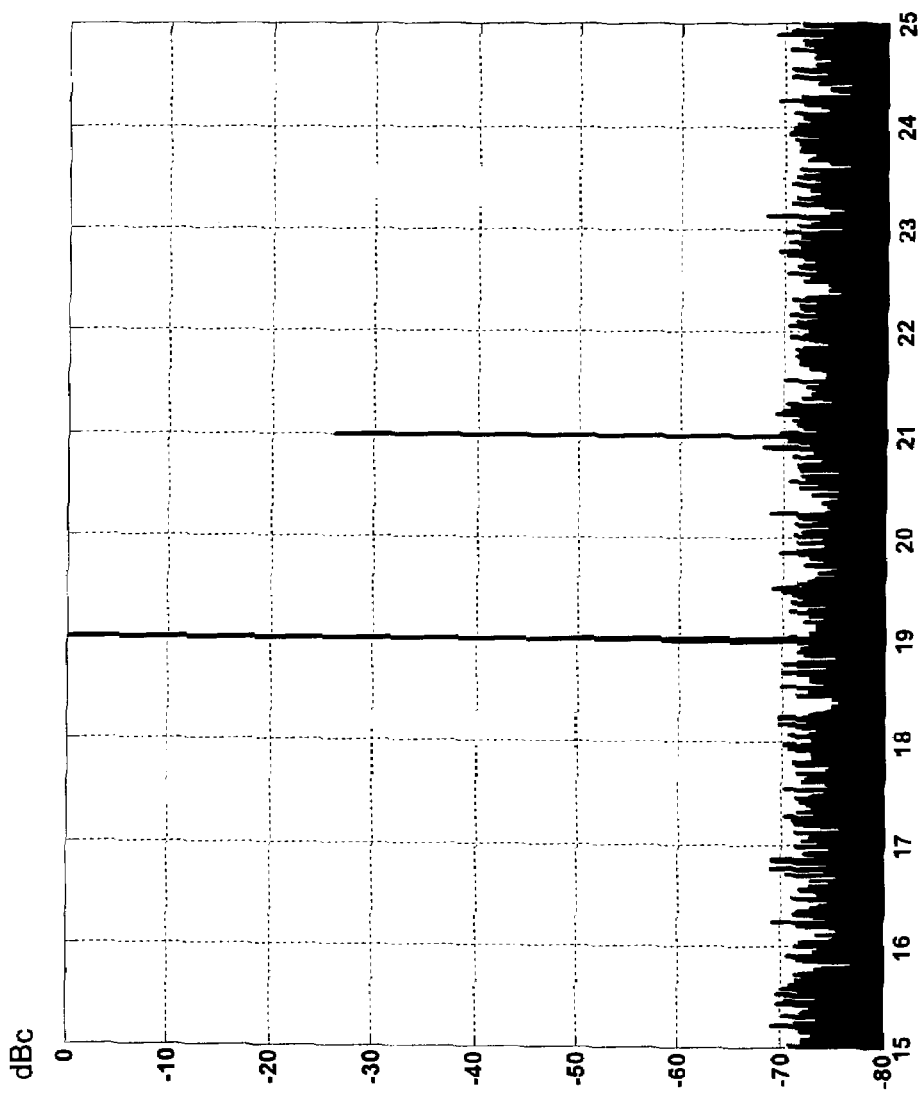
FIG. 7 and FIG. 8 illustrate transmitter image rejection without and with I/Q imbalance compensation as described in the various embodiments of the invention.
Figure 8:
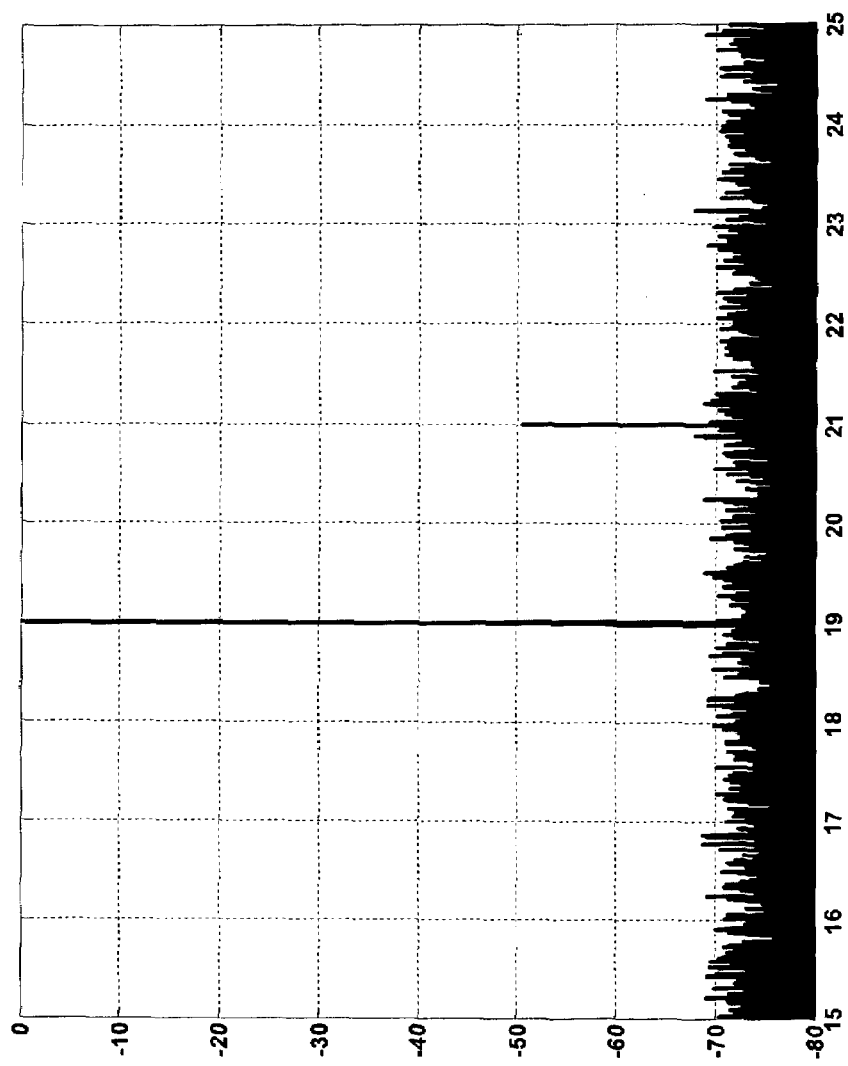

FIGS. 7 and 8 illustrate transmitter image rejection without and with I/Q imbalance compensation as described in the various embodiments of the invention. As an example of the validity of (12) for sinusoidal transmitter testing, consider FIG. 7 which shows the simulated RF output spectrum in decibel relative-to-the-carrier (dBc) versus frequency of the transmitter of FIG. 1 with I/Q imbalance parameters (ignoring for this analysis, any I/Q imbalance compensation):

$$\theta=\pi/64 \text{ rads.} \approx 2.8° \text{ and } \epsilon=10\%.$$

The figure shows a simulated transmitter image rejection ratio of approximately 25.9 dB. As predicted by (12), $$TUIRR = 6 + 10 \times \log_{10}\left(\frac{1+0.1}{0.1^2 + \left(\frac{\pi}{64}\right)^2}\right) dB = 25.5 \text{ dB},$$

in good agreement with the simulated result shown in FIG. 7.

As mentioned above, the transmitter I/Q imbalance parameters $\theta$ and $\epsilon$ are rarely known precisely, but must instead be estimated in order to perform I/Q imbalance compensation. This results in the transmitter system depicted in FIG. 4, where $$K_\varepsilon = \frac{1}{1+\varepsilon_e},$$

and where $\theta_e$ and $\epsilon_e$ denote estimates of the actual I/Q imbalance parameters $\theta$ and $\epsilon$. Thus, $\theta_e = \theta - \Delta\theta$ and $\epsilon_e = \epsilon - \Delta\epsilon$, where $\Delta\theta$ and $\Delta\epsilon$ denote the errors associated with the representation of $\theta$ and $\epsilon$. Notice that these errors may be combinations of both estimation errors as well as errors in the numerical representation of $\theta$ and $\epsilon$.

Then, according to the I/Q imbalance compensation scheme of FIG. 4, the compensated transmitter satisfies $$s(t) = \left(1 + \sum_{j=1}^{\infty} \frac{(\pm 1)^j}{(j-1)!}\varepsilon_e^j\right) I(t)(1+\varepsilon)\cos(\omega_c t + \theta) + [Q(t) + \theta_e I(t)]\sin(\omega_c t).$$

Applying the approximations $$\left(1 + \sum_{j=1}^{\infty} \frac{(\pm 1)^j}{(j-1)!}\varepsilon_e^j\right)(1+\varepsilon) = 1 + \varepsilon - \varepsilon_e + \sum_{j=2}^{\infty} \frac{(\pm 1)^j}{(j-1)!}\varepsilon^j \varepsilon$$

$$\approx 1 + \Delta\varepsilon$$

and $$\frac{\theta_e}{1+\Delta\varepsilon} \approx \theta_e$$

yields $s(t) \approx (1+\Delta\varepsilon) I(t)[\cos(\omega_c t) - \Delta\theta \sin(\omega_c t)] + Q(t)\sin(\omega_c t).$ Thus, for sinusoidal transmitter signals, $s(t) = (1+\Delta\varepsilon)\cos(\omega_{IF} t)[\cos(\omega_c t) - \Delta\theta \sin(\omega_c t)] + \sin(\omega_{IF} t)\sin(\omega_c t),$ and it follows directly from the derivation of (12) that the ratio between the powers of the signals in the desired band and the image band of the compensated transmitter is the transmitter compensated image rejection ratio, TCIRR, $$TCIRR = 6 + 10 \times \log_{10}\left(\frac{1+\Delta\varepsilon}{(\Delta\varepsilon)^2 + (\Delta\theta)^2}\right) dB. \quad (13)$$

As mentioned above, in practice, perfect image rejection is not needed. Typically, it suffices to calibrate the transmitter such that TCIRR>35 dB or so, since the impact of I/Q imbalance on transmitter modulation performance with such image rejection is negligible. This fact allows for a precise quantification of the arithmetic needed for sufficient I/Q imbalance compensation.

FIG. 8, as stated before, illustrates I/Q imbalance compensation effects upon transmitter image rejection. Considering the transmitter of FIGS. 3 and 4, but now with I/Q imbalance compensation, it will be shown below that the I/Q imbalance compensation improves transmitter image rejection ratios for a transmitter to acceptable values. Equation (13) allows for a quantification of the worst-case image rejection ratio of the compensated transmitter of FIG. 4, assuming that numerical representation errors are the only sources of errors of $\theta_e$ and $\epsilon_e$. For example, suppose that for any I/Q imbalance parameters $|\theta| \leq 5°$ and $|\epsilon| \leq 10\%$, the worst case representation errors are $|\Delta\theta| \leq 2^{-8}$ and $|\Delta\epsilon| \leq 2^{-8}$, respectively. It follows from (13) that $$TCIRR \geq 6 + 10 \times \log_{10}\left(\frac{1}{2(2^{-8})^2}\right) dB = 51.2 \text{ dB}.$$

This value is also illustrated in the simulation results of FIG. 8 which shows the simulated RF output spectrum in dBc versus frequency of the transmitter of FIG. 4 with I/Q imbalance compensation parameters $$\theta_e = \frac{\pi}{64} - 2^{-8} \text{ and } K_\varepsilon = \frac{1}{1.1 - 2^{-8}}.$$

FIG. 8 shows a simulated transmitter image rejection ratio of approximately 50.8 dB, in good agreement with the prediction of (13).

Equation (13) also suggests a computationally simple yet efficient algorithm for calculating optimal values of the compensation parameters $\theta_e$ and $K_\epsilon$, i.e., the values that yield maximum image rejection of the compensated transmitter. The expression for $T_{CIRR}$ shows that this task is approximately a quadratic optimization problem in the variables $\theta_e$ and $K_\epsilon$. Furthermore, $\theta_e$ and $K_\epsilon$ can be optimized independently to yield the maximum possible image rejection. Thus, an optimization algorithm based upon the method of steepest descent can be defined as follows:

Let $K_\epsilon$ be defined by M+1 binary coefficients as in $$K_\varepsilon = 1 + s_\varepsilon \sum_{i=0}^{M-1} a_i 2^{-(i+N)}$$

where $s_\epsilon \in \{-1,+1\}$ and $a_i \in \{0,1\}$, N is an integer

Let $\theta_e$ be defined by P+1 binary coefficients as in $$\theta_e = s_\theta \sum_{i=0}^{P-1} b_i 2^{-(i+Q)}$$

where $s_\theta \in \{-1,+1\}$ and $b_i \in \{0,1\}$, Q is an integer

As, such the algorithm listed on the following page includes performing the following calculations for both $K_\epsilon$ and $\theta_e$:

$K_\epsilon = 1$;
$\theta_e = 0$;
$LSB = 2^{-M-N+1}$;
SetIqImbalanceCompensationParams($K_\epsilon, \theta_e$);
TransmitSinusoidalTestTone;

T$_{CIRR,LAST}$=MeasureImageRejectionRatio;
for i=0 to M−1
Step=2$^{-i-N}$;
K$_\epsilon$=K$_\epsilon$+LSB;
SetIqImbalanceCompensationParams(K$_\epsilon$,θ$_e$);
TransmitSinusoidalTestTone;
T$_{CIRR}$=MeasureImageRejectionRatio;
if T$_{CIRR}$>T$_{CIRR,LAST}$ then
   K$_\epsilon$=K$_\epsilon$−LSB+Step;
else
   K$_\epsilon$=K$_\epsilon$−LSB−Step;
end
SetIqImbalanceCompensationParams(K$_\epsilon$,θ$_e$);
TransmitSinusoidalTestTone;
T$_{CIRR,LAST}$=MeasureImageRejectionRatio;
end
Repeat the above loop for θ$_\epsilon$ In the described embodiment of the invention, five selectable constant amplification modules are used for compensation values for K$_\epsilon$ and θ$_e$. Thus, a total maximum of 2M+2P+1 number of TCIRR measurements are required to arrive at optimal values for K$_\epsilon$ and θ$_e$ wherein M and P are the numbers of selectable constant amplification modules. In the previous example where M=P=5, a maximum of 21 iterations are required. This is in contrast to the 4096 possible values of the pair (K$_\epsilon$, θ$_\epsilon$.). Accordingly, production chips may readily be tested and adjusted by determining the optimum values of K$_\epsilon$ and θ$_e$ because so few iterations are required. Stated differently, the efficiency of the described algorithm allows for the optimum values to be programmed on a chip by chip basis for production chips thereby compensating for process variations.

The above method converges robustly even in the presence of saturation effects, such as caused by approximations made in the above derivations as well as circuit design limitations, that may change the achievable TCIRR beyond what is predicted by (13).

Figure 9:
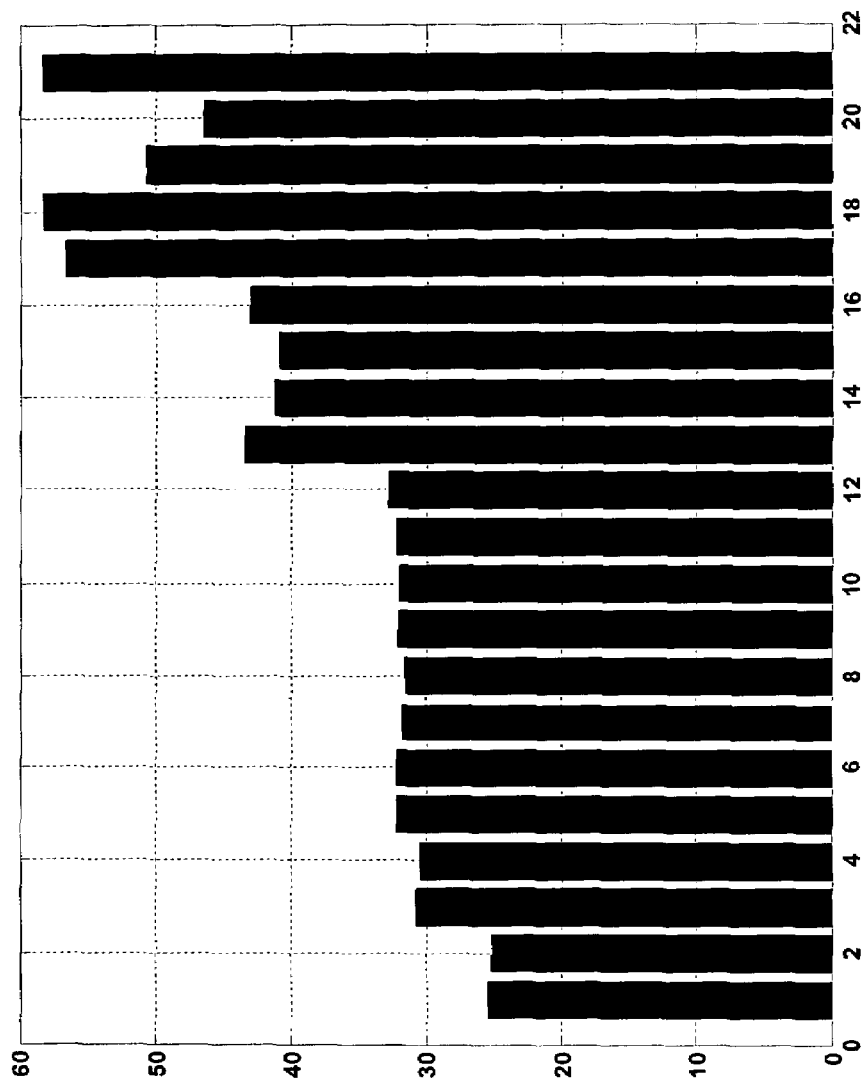
FIG. 9 shows a typical example of a simulated sequence of TCIRR measurements when the image rejection of an RF transmitter is calibrated using the algorithm described in the present invention.

FIG. 9 shows a typical example of a simulated sequence of TCIRR measurements when the image rejection of an RF transmitter, such as in FIG. 3 or 4, is calibrated using the algorithm described in the above. Specifically, compensation parameters in the formats of equations (8) and (9) were employed, resulting in a total number of TCIRR measurement steps equal to 21. The imbalance parameters were the same as used in FIG. 8, i.e., θ=π/64 radians.≈2.8° and ϵ=10%. For each TCIRR measurement step, the corresponding value of TCIRR is shown in the bar graph. The optimal TCIRR arrived at is 58 dB, in good agreement with equation (13), corresponding to compensation parameter values K$_\epsilon$=0.91015625 and θ$_e$=0.05078125 radians.

To achieve the results shown in FIG. 9, the amounts of amplification for the values of K$_\epsilon$ and θ$_e$ must be set in hardware. FIGS. 5 and 6, as described above, are used to determine and set these values. Referring back to FIG. 5, compensation logic for an in-phase amplitude compensator consistent with the above calculations for determining and setting a value of K$_\epsilon$ for imbalance compensation. As may be seen, five selectable amplification modules 282-290 are coupled to receive the in-phase component (I) of the digital information signal produced by a digital modulation block, e.g., digital modulation block 162 of FIG. 4. The five selectable amplification modules 282-290 each produce a constant amount of amplification given by 2$^{-i-N}$ for i=0 to M−1, where M is the number of amplification modules and where N=4 in the described embodiment. Accordingly, module 282 produces a gain that is equal to 2$^{-4}$ of the input. Similarly, modules 284, 286, 288 and 290 each have gains of 2$^{-5}$, 2$^{-6}$, 2$^{-7}$, and 2$^{-8}$, respectively, in the described embodiment of the invention. The output of each module 282-290 as well as a "0" gain input value produced by "0" inputs 292-300 are produced to multiplexers 302-310, respectively. Each of the five multiplexers receives a bit of a compensation control signal and selects between the received gain from a corresponding amplification module and a "0" input. Each of the multiplexers 302-310 then produces a selected output to adders 312-318, respectively. Adders 312-318 are sequentially coupled to sum the selected outputs of multiplexers 302-310. Thus, adder 318 sums the outputs of multiplexers 308 and 310. Adder 316 sums the outputs of multiplexer 306 and adder 318. Adder 314 sums the outputs of multiplexer 304 and adder 316. Finally, adder 312 sums the outputs of multiplexer 302 and adder 314 to produce a sum of all of the selected inputs of amplification modules 282-290 and "0" inputs 292-300, by multiplexers 302-310, respectively. The summed output produced by adder 312 is produced to a sign inverter 320 and to multiplexer 322. The output of sign inverter 320 is also produced to multiplexer 322. Multiplexer 322 is further coupled to receive a sign selection bit to select between the summed value and the negative of the summed value produced by adder 312. The output of multiplexer 322 is then produced to an adder 324 which sums the output of multiplexer 322 with the original in-phase component to produce the value K$_\epsilon$ as described in the above calculations.

Referring back to FIG. 6, compensation logic for a phase compensator such as phase compensator 172 of FIG. 4 is shown for determining and setting a value of θ$_e$ for imbalance compensation consistent with above calculations according to one embodiment of the described invention. As may be seen, five selectable amplification modules 350-358 are coupled to receive the in-phase component (I) of the digital information signal produced by a digital modulation block, e.g., digital modulation block 162 of FIG. 4. The five selectable amplification modules 350-358 each produce a constant amount of amplification given by 2$^{-i-N}$ for i=0 to P−1, where P is the number of amplification modules and where N=4 in the described embodiment. Accordingly, amplification module 350 produces a gain that is equal to 2$^{-4}$ of the input. Similarly, modules 352, 354, 356 and 358 each have gains of 2$^{-4}$, 2$^{-5}$, 2$^{-6}$, 2$^{-7}$, and 2$^{-8}$, respectively. The output of each amplification module 350-358 as well as a "0" gain input value produced by "0" inputs 360-368 are produced to multiplexers 370-378, respectively. Each of the five multiplexers receives a bit of a compensation control signal and selects between the received gain from a corresponding amplification module and a "0" input. Each of the multiplexers 370-378 then produces a selected output to adders 380-386, respectively. Adders 380-386 are sequentially coupled to sum the selected outputs of multiplexers 370-378. Thus, adder 386 sums the outputs of multiplexers 378 and 376. Adder 384 sums the outputs of multiplexer 374 and adder 386. Adder 382 sums the outputs of multiplexer 372 and adder 384. Finally, adder 380 sums the outputs of multiplexer 370 and adder 382 to produce a sum of all of the selected inputs of amplification modules 350-358 and "0" inputs 360-368, by multiplexers 370-378, respectively. The summed output produced by adder 380 is produced to a sign inverter 388 and to multiplexer 390. The output of sign inverter 388 is also produced to multiplexer 390. Multiplexer 390 is further coupled to receive a sign selection bit (S$_\epsilon$) to select between the summed value and the negative of the summed value produced by adder 380. The output of multiplexer 390 is then produced to an adder 392 which sums the output of multiplexer 390 with the original quadrature phase component to produce the value $\theta_e$ as described in the above calculations.

FIG. 10 shows the typical top level block diagram of an RF receiver in accordance with modem design principles. The radio receiver 400 of FIG. 10 includes an antenna, low noise amplifier (LNA), mixers, analog-to-digital converters (ADC) and a digital demodulator that recovers the transmitted symbols embedded in the transmitter in-phase and quadrature signals I(t) and Q(t). Generally, anyone of the analog components of the receiver of FIG. 10 may introduce phase or magnitude distortion to an in-going signal thereby producing an I/Q imbalance. Accordingly, an I/Q compensation block within the digital demodulator serves to compensate for such imbalance introduced in the receive path.

More specifically, low noise amplifier 404 produces an amplified RF signal to mixers 408 and 412 which, in turn, ingoing continuous waveform signals having in-phase and quadrature phase components to low pass filters 420 and 424. Low pass filters 420 and 424 produce a filtered continuous waveform signal having in-phase and quadrature phase components to analog-to-digital converters 428 and 432, respectively. ADCs 428 and 432, in turn, produce in-phase digital signals and quadrature phase digital signals, respectively, that are produced to digital demodulator 436 for processing as described above. Digital demodulator 436 demodulates the received in-phase and quadrature phase signals to produce digital bits out to baseband processor 440 of digital processor 444 for subsequent processing of the information contained within the digital bits produced by digital demodulator 436.

In one embodiment of the present invention, compensation logic within the digital modulator produces compensation control signals to the amplifiers that create the imbalance compensation. More specifically, the compensation control signals are produced to the amplifier that compensates the amplitude of the in-phase component by a first amount and that amplifies the in-phase component by a second amount which is then summed with the quadrature component of the digital information signal to compensate the quadrature component both in-phase and magnitude. The respective amplifiers that produce the amplitude compensation for the I component and the amplitude and phase compensation for the Q component are, in the described embodiment of the invention, comprised of a plurality of individually selectable constant amplification modules as described in relation to FIGS. 5 and 6.

FIG. 11 is a functional block diagram of a radio receiver with I/Q imbalance compensation according to one embodiment of the present invention. A radio receiver is formed in an analogous manner to the radio transmitter except that a digital demodulator operates on a receive path after I/Q imbalance is introduced in upstream components. More specifically, a digital processor of a radio receiver is coupled to receive in-phase and quadrature phase digital signals which are then compensated for I/Q imbalance according to the described embodiments of the invention. The in-phase digital signal is magnitude amplified by a constant amount and is summed with an amplified quadrature phase digital signal component to produce the in-phase portion of a compensated digital information signal $R_I(t)$. The quadrature phase portion of the compensated digital information signal $R_q(t)$, in the receiver, is not adjusted in the described embodiment of the invention. The in-phase and quadrature phase of the signals collectively form the compensated digital information signal that is then produced to a digital de-modulator that demodulates the compensated digital information signal and produces digital bits out for processing to baseband processor (not shown here in FIG. 11, for example, the bits may be produced to baseband processor 440 of FIG. 10). The processing upstream from digital processor 450 in FIG. 11 is similar to that described in relation to FIG. 10. FIG. 11, however, provides more details of one embodiment of the processing within digital processor 450.

More specifically, digital processor 450 includes a first amplifier 454 (an in-phase component amplitude compensator), also referenced herein as the first part of the two-part amplification logic of the receiver, receives an in-phase digital signal which is produced by ADC 428 and amplifies the in-phase digital signal to produce an amplitude compensated in-phase digital signal. A second amplifier 458, also referenced herein as the second part of the two-part amplification logic of the receiver (a phase component compensator), receives the quadrature phase digital signal produced by ADC 432 and amplifies the quadrature phase digital signal by a second amount which is then summed with the in-phase component produced by first amplifier 454 to produce a compensated digital information signal that is phase and magnitude compensated for in-phase and quadrature phase imbalances. It is to be understood, of course, that perfect compensation is not required and that granularity of using a limited number of amplification increments within the first and second amplifiers practically precludes perfect compensation at the benefit of simplicity and efficiency. One noteworthy point is that the simple approach of the present invention provides adequate imbalance compensation that may be used in a production setting on a chip-by-chip basis to improve performance due to I/Q imbalance.

More specifically, the two-part amplification logic comprised of the first and second amplifiers 454 and 458 of digital processor 450 amplifies ingoing in-phase digital signal by a first amount to produce an in-phase component of the compensated digital information signal that is amplitude compensated and wherein a second of the two-part amplification logic amplifies the quadrature phase digital signal by a second amount to produce a quadrature phase signal component that is summed with the in-phase digital signal to produce the compensated digital information signal that is phase and magnitude compensated for in-phase and quadrature phase imbalances introduced by upstream analog components.

The RF signal s(t) is thus assumed to be of the form $$s(t)=I(t)\cos(\omega_c t)+Q(t)\sin(\omega_c t),$$

where I(t) and Q(t) denote the in-phase and quadrature components of the transmitted signal. Referring to FIG. 8, it is the objective of the receiver to translate the in-phase and quadrature signal to baseband, i.e., to operate such that $$R_I(t)=I(t) \text{ and } R_Q(t)=Q(t).$$

With ideal circuit behavior, the local oscillator generates sinusoidal signals according to $$I_{LO}(t)=2\cos(\omega_c t)$$

and $$Q_{LO}(t)=2\sin(\omega_c t)$$

Thus, the mixer products on the in-phase and quadrature paths are $$I'(t)=s(t)\times 2\cos(\omega_c t)=[I(t)\cos(\omega_c t)+Q(t)\sin(\omega_c t)]\times 2\cos(\omega_c t)=I(t)+I(t)\cos(2\omega_c t)+Q(t)\sin(2\omega_c t)$$

and $$Q'(t)=s(t)\times 2\sin(\omega_c t)=[I(t)\cos(\omega_c t)+Q(t)\sin(\omega_c t)]\times 2\sin(\omega_c t)=I(t)\sin(2\omega_c t)+Q(t)-Q(t)\cos(2\omega_c t),$$

respectively. Thus, after low pass filtering and conversion to digital by analog-to-digital converters (ADCs), $$R_I(t)=I(t) \text{ and } R_Q(t)=Q(t),$$

as desired.

In the presence of I/Q imbalance, $$I_{LO}(t)=2(1+\epsilon)\cos(\omega_c t+\theta).$$

Then $$I'(t)=s(t)\times 2(1+\epsilon)\cos(\omega_c t+\theta)\approx[I(t)\cos(\omega_c t)+Q(t)\sin(\omega_c t)]\times 2(1+\epsilon)[\cos(\omega_c t)-\theta\sin(\omega_c t)]=(1+\epsilon)[I(t)+I(t)\cos(2\omega_c t)+Q(t)\sin(2\omega_c t)-\theta I(t)\sin(2\omega_c t)-\theta Q(t)+\theta\cos(2\omega_c t)]$$

After low pass filtering and conversion to digital, $$R_I(t)=(1+\epsilon)[I(t)-\theta Q(t)]$$

Thus, the "cross-talk" factor between the in-phase and quadrature phases of the receiver is given by $$(1+\epsilon)\theta,$$

which is identical to the cross-talk factor for transmitters given in (5).

The above equations suggest a receiver I/Q imbalance compensation scheme as shown in FIG. 9.

According to this scheme, $$R_I(t)=(1+\epsilon)[I(t)-\theta Q(t)]K_\epsilon+\theta Q(t)\approx[I(t)-\theta Q(t)]+\theta Q(t)=I(t),$$

as desired. Considerations analogous to those for uncompensated and compensated transmitter image rejection ratios apply to receivers, and an algorithm for finding optimal compensation parameters similar to the one derived for transmitters can be established.

FIG. 12 is a flow chart illustrating a method for compensating for I/Q imbalance and for producing an integrated circuit radio transceiver according to one embodiment of the invention. The invention includes producing an integrated circuit radio transceiver chip (step 500) and testing the integrated circuit radio transceiver chip to determine a transceiver operational metric comprising at least one of a transmitter image rejection ratio and a receiver error rate (step 502). Additionally, the invention includes evaluating the determined transceiver operational metric to determine whether a specified metric requirement is satisfied (step 504) and, based upon the evaluating step, determining whether to introduce imbalance compensation in at least one of a receive path or a transmit path (step 506).

Assuming imbalance compensation is required, the invention further includes determining an imbalance compensation amount (step 508). Thereafter, the invention includes amplifying an in-phase component in at least one of the receive path and the transmit path (step 510) in order to magnitude compensate the in-phase component. Additionally, the invention includes introducing imbalance compensation comprising at least one of amplifying the in-phase component and adding the amplified in-phase component to a quadrature component in the transmit path or amplifying the quadrature phase component and adding the amplified quadrature phase component to the in-phase component in the receive path (step 512). Finally, the invention includes an optional step of producing additional integrated circuit radio transceiver chips including the introduced imbalance compensation (step 514). As an alternative to incorporating the determined imbalance compensation into future production chips, the efficiency of the present invention allows for calibrating each chip on a chip-by-chip basis.

FIG. 13 is a flow chart illustrating a method for compensating for I/Q imbalance in production chips according to one embodiment of the present invention. Generally, the method of FIG. 13 may be performed in conjunction with step 508 of FIG. 12, namely, determining a compensation amount for the I/Q imbalance compensation parameters. Initially, the invention includes setting an in-phase amplitude amplification constant to unity (step 520) and setting a phase amplification constant to zero (step 522) and, thereafter, transmitting a test tone (step 524).

After transmitting the test tone, the invention includes measuring the operational metric (step 526) and adjusting one of the in-phase amplification constant or phase amplification constant by a first step size and measuring the operational metric (step 528). Thereafter, the invention includes adjusting the amplification constant of the previous step by a second step size wherein the second step size is substantially greater than the first step size (step 530) and repeating the adjustment steps M times wherein M is equal to a number of selectable amplification adjustments to one of the in-phase amplitude amplification constant or the phase amplification constant (step 532).

As stated before, the circuit and method according to the present invention is beneficial in that it provides for rapid determination of compensation parameters that improve transceiver operation. In the described embodiments of the invention, the method is terminated once one of the image rejection ratio or the error metric satisfy respective specified values. In no case, however, does the method exceed more than (4*M+4*P+1) iterations for the logic shown (for example, in FIGS. 5 and 6 that each provide for five selectable constant amounts of amplification. In the described embodiment of FIGS. 5 and 6, M and P are each equal to 5 thereby limiting the total number iterations to 19 as a maximum number.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A radio transmitter within a radio transceiver, comprising:
   a digital modulator that receives outgoing digital data, that digitally modulates the outgoing digital data to produce a digital information signal, and that compensates the digital information signal to produce a pre-compensated digital information signal that is pre-compensated for phase and magnitude imbalance of at least one analog downstream radio transceiver circuit component, the digital modulator further including an adder to sum in-phase signal component and quadrature phase signal component of the pre-compensated digital information signal to produce an outgoing signal for transmission;

a digital-to-analog converter (DAC) that receives the pre-compensated digital information signal and that converts the pre-compensated digital information signal to produce a continuous waveform analog signal;

a downstream filter that filters the continuous waveform analog signal to produce a filtered continuous waveform analog signal;

phase locked loop circuitry (PLL) that receives the filtered continuous waveform analog signal to produce an output information signal in a selected frequency band; and wherein the digital modulator includes a two-part amplification logic wherein a first part of the two-part amplification logic amplifies the in-phase component of the digital information signal and wherein a second of the two-part amplification logic amplifies the in-phase component of the digital information signal and further wherein the second part of the two-part amplification logic further includes a plurality of selectable amplification modules to provide selectable amounts of constant amplification of the in-phase signal component of the digital information signal that are summed with the quadrature phase signal component of the digital information signal to produce a quadrature portion of the pre-compensated digital information signal that is phase compensated.

2. The radio transmitter of claim 1 further including compensation logic for producing a compensation control signal to the first part of the two-part amplification logic to individually control amplification levels of the first part of the two-part amplification logic.

3. The radio transmitter of claim 1 wherein the plurality of selectable amplification modules of the first part of the two-part amplification logic is greater than or equal to five selectable amplification modules and wherein the compensation control signal received by the first part of the two-part amplification logic is at least five bits long for individually selecting the selectable amplification modules.

4. The radio transmitter of claim 3 further including a selectable inverter for selectably inverting a polarity of a sum of the selectable amounts of constant amplification of the in-phase signal component.

5. The radio transmitter of claim 4 wherein the compensation signal further includes a bit for selecting the inverter.

6. The radio transmitter of claim 1 further including compensation logic for producing a compensation control signal to the second part of the two-part amplification logic to individually control amplification levels of the second part of the two-part amplification logic.

7. The radio transmitter of claim 1 wherein the plurality of selectable amplification modules of the second part of the two-part amplification logic is greater than or equal to five selectable amplification modules and wherein the compensation signal received by the second part of the two-part amplification logic is at least five bits long for individually selecting the selectable amplification modules.

8. The radio transmitter of claim 7 further including a selectable inverter for selectably inverting a polarity of a sum of the selectable amounts of constant amplification of the in-phase signal component.

9. The radio transmitter of claim 8 wherein the compensation signal further includes a bit for selecting the inverter.

10. The radio transmitter of claim 1 wherein a quadrature phase (Q) portion of the pre-compensated digital information signal includes an in-phase (I) component compensation.

11. The radio transmitter of claim 10 further comprising compensation logic for setting an amount of the in-phase component compensation that is produced to the adder for summing with the quadrature phase portion.

12. The radio transmitter of claim 11 wherein the in-phase component compensation includes an amplified component of a specified amount.

13. The radio transmitter of claim 12 further comprising compensation logic for setting an amount of in-phase component amplification of the in-phase component compensation.

14. A radio receiver, comprising:
a low noise amplifier for receiving an RF signal and for amplifying the RF signal;
phase locked loop circuitry (PLL) that receives the amplified RF signal to produce a down converted in-going continuous waveform signal having in-phase and quadrature phase components;
filtering circuitry that filters the in-going continuous waveform signal to produce filtered continuous waveform in-phase and quadrature phase components;
analog-to-digital converter (ADC) circuitry that receives the filtered continuous waveform in-phase and quadrature phase component and that produces in-going in-phase and quadrature phase digital signals;
a digital de-modulator that receives in-going in-phase and quadrature phase digital signals, that digitally de-modulates the in-going digital signals to produce digital bits out, and that compensates the in-going in-phase digital signal to produce a compensated digital information signal that is compensated for phase and magnitude imbalance of at least one analog upstream receiver circuit component, the digital de-modulator further including an adder to sum the in-going in-phase digital signal and the in-going quadrature phase digital signal of the in-going in-phase and quadrature phase components of the compensated digital information signal to produce digital bits for processing by a processor; and
wherein the digital de-modulator includes a two-part amplification logic wherein a first part of the two-part amplification logic amplifies the in-phase component of the digital signals and wherein a second of the two-part amplification logic amplifies the quadrature-phase component of the digital signals and further wherein the second part of the two-part amplification logic further includes a plurality of selectable amplification modules to provide selectable amounts of constant amplification of the quadrature-phase signal component.

15. A method for producing an integrated circuit radio transceiver, comprising:
producing an integrated circuit radio transceiver chip;
testing the integrated circuit radio transceiver chip to determine a transceiver operational metric comprising at least one of a transmitter image rejection ratio and a receiver error rate;
evaluating the determined transceiver operational metric to determine whether a specified metric requirement is satisfied;
based upon the evaluating step, determining whether to introduce imbalance compensation in at least one of a receive path or a transmit path;

amplifying an in-phase component in at least one of the receive path and the transmit path;

determining an imbalance compensation amount, comprising:

setting an in-phase amplitude amplification constant to unity;

setting a phase amplification constant to zero;

transmitting a test tone;

measuring the transceiver operational metric;

adjusting one of the in-phase amplification constant or phase amplification constant by a first step size and measuring the transceiver operational metric;

adjusting the amplification constant of the previous step by a second step size wherein the second step size is substantially greater than the first step size; and repeating the adjustment steps M times wherein M is equal to a number of selectable amplification adjustments to one of the in-phase amplitude amplification constant or the phase amplification constant;

introducing imbalance compensation comprising at least one of amplifying the in-phase component and adding the amplified in-phase component to a quadrature component in the transmit path or amplifying the quadrature phase component and adding the amplified quadrature phase component to the in-phase component in the receive path; and producing additional integrated circuit radio transceiver chips including the introduced imbalance compensation.

16. The method of claim 15 wherein the method is terminated once one of the transmitter image rejection ratio or the receiver error rate metric satisfy respective specified values.

17. The method of claim 16 wherein the method is terminated after no more than (4*M+1) iterations.

* * * * *